United States Patent
Johnston

(10) Patent No.: US 6,481,324 B1
(45) Date of Patent: Nov. 19, 2002

(54) CHAIN SAW CADDIE

(76) Inventor: Marvin P. Johnston, 10772 NW. 110th St., McCune, KS (US) 66753

( * ) Notice: Subject to any disclaimer, the term of this patent is extended or adjusted under 35 U.S.C. 154(b) by 0 days.

(21) Appl. No.: 09/586,820

(22) Filed: Jun. 5, 2000

(51) Int. Cl.$^7$ ................................................ A01G 23/08
(52) U.S. Cl. ............................. 83/795; 83/574; 83/928; 144/34.1
(58) Field of Search ..................... 83/795, 928, 574; 144/24.12, 334, 34.1, 48.6

(56) References Cited

U.S. PATENT DOCUMENTS

| | | | |
|---|---|---|---|
| 789,512 A | * 5/1905 | Waller | |
| 846,869 A | 3/1907 | Snow | |
| 2,348,588 A | * 5/1944 | Arsneau | |
| 2,423,047 A | 6/1947 | Pfingsten | |
| 2,618,350 A | 11/1952 | Von Ruden | |
| 2,815,049 A | * 12/1957 | Herscovitch | |
| 3,123,112 A | * 3/1964 | Hodges et al. | |
| 3,604,479 A | * 9/1971 | Jordan | |
| 3,970,125 A | 7/1976 | Muirhead et al. | 144/34 R |
| 4,245,535 A | 1/1981 | Lockwood et al. | 83/798 |
| 4,320,679 A | 3/1982 | Trudeau | 83/574 |
| 4,342,243 A | 8/1982 | Porritt | 83/574 |
| 4,351,209 A | 9/1982 | Alford | 83/788 |
| 4,553,463 A | 11/1985 | Engel | 83/796 |
| 4,722,258 A | 2/1988 | Johnson | 83/72 |
| 5,390,715 A | * 2/1995 | Luscombe | |
| 5,735,323 A | * 4/1998 | Maloch | |

FOREIGN PATENT DOCUMENTS

| | | | |
|---|---|---|---|
| DE | 925548 | * | 3/1955 |
| DK | 74416 | * | 7/1952 |

* cited by examiner

*Primary Examiner*—Kenneth E. Peterson
(74) *Attorney, Agent, or Firm*—William R. Sharp

(57) ABSTRACT

There is disclosed herein a caddie for a chain saw having a saw bar, comprising: at least one wheel, having a rotational axis, for resting upon a supporting surface with the rotational axis substantially parallel thereto; a mounting bracket, supported by the wheel(s), to which the chain saw can be fixedly but removably mounted and oriented in a position in which its saw bar defines and lies in a plane substantially parallel and closely adjacent to the supporting surface; and handlebars, in a fixed relationship to the mounting bracket, for being grasped by a user of the caddie in movement and manipulation thereof.

17 Claims, 2 Drawing Sheets

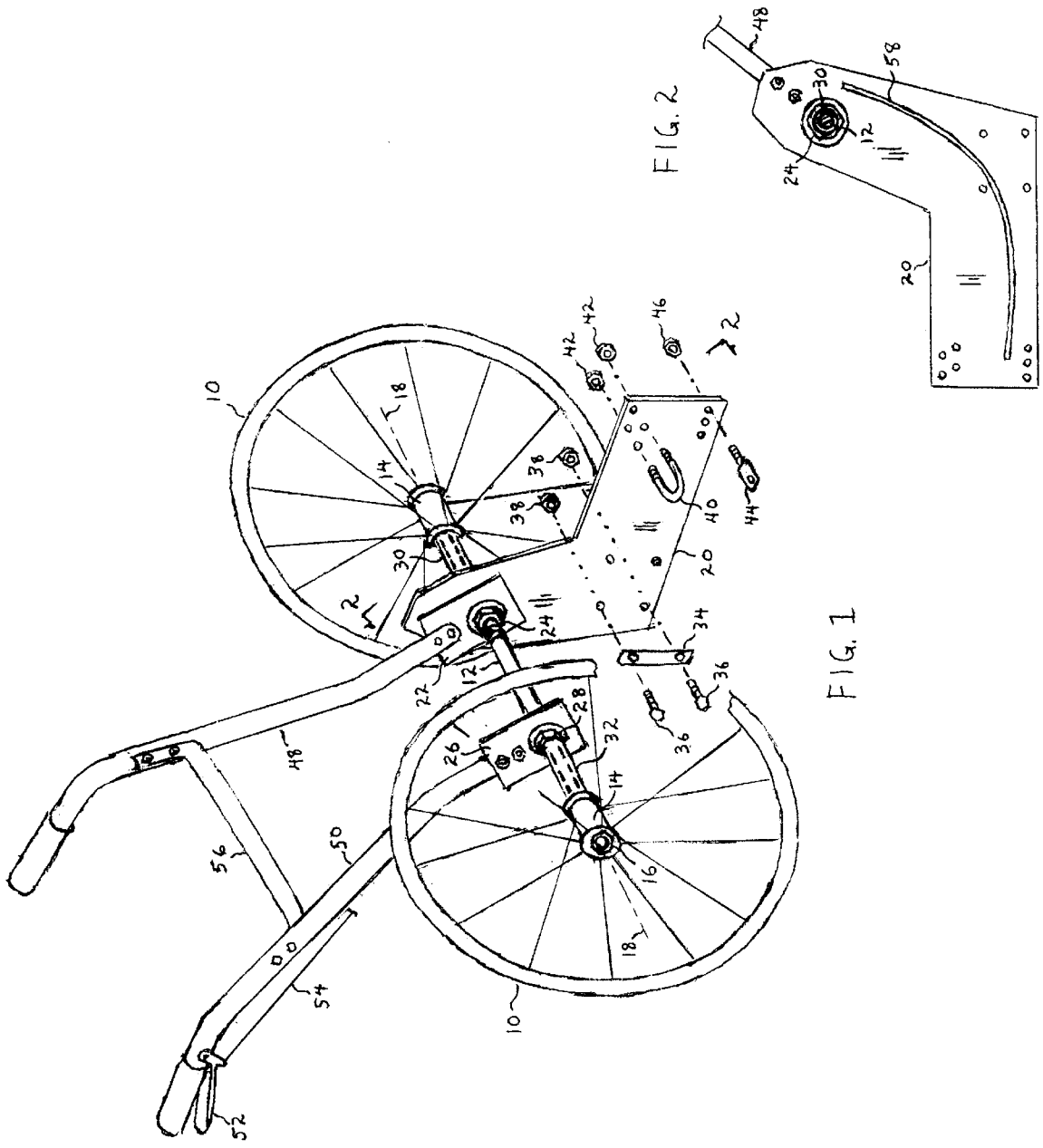

US 6,481,324 B1

CHAIN SAW CADDIE

BACKGROUND OF THE INVENTION

The invention relates to a caddie for supporting and carrying a chain saw.

In cutting down trees near ground level with a chain saw, a person handling the saw must bend over while supporting the saw in the proper position. This can be very strenuous and tiring, especially when cutting a number of trees in succession. Some individuals having insufficient strength or back problems may even find such a task impossible.

SUMMARY OF THE INVENTION

It is, therefore, an object of the invention to provide a chain saw caddie which enables a user thereof to easily cut trees close to the ground without having to bend over or support the weight of the saw.

The above object is realized by a caddie for a chain saw having a saw bar, comprising: at least one wheel, having a rotational axis, for resting upon a supporting surface with the rotational axis substantially parallel thereto; a mounting means, supported by the wheel(s), to which the chain saw can be fixedly but removably mounted and oriented in a position in which its saw bar defines and lies in a plane substantially parallel and closely adjacent to the supporting surface; and a handlebar means, in a fixed relationship to the mounting means, for being grasped by a user of the caddie in movement and manipulation thereof.

According to a preferred embodiment hereafter described, the chain saw caddie includes a pair of wheels rotatably mounted to an axle, a pair of handlebars fixedly connected to the axle, a mounting bracket also fixedly connected to the axle, and three separate fastener mechanisms for fixedly but removably securing different portions of the chain saw to the mounting bracket. With a chain saw mounted to the mounting bracket, a user of the caddie can simply grasp and manipulate the handlebars to roll the chain saw from tree to tree, raise or lower the saw bar of the chain saw, and position the saw bar as previously described in order to cut a tree near the surface of the ground while standing upright behind the handlebars. While standing in such a position, the user is also advantageously spaced several feet from the chain saw, which is inherently a loud and dangerous tool.

BRIEF DESCRIPTION OF THE DRAWINGS

FIG. 1 is a perspective view of one embodiment of the chain saw caddie.

FIG. 2 is a fragmentary view of the caddie as viewed along line 2—2 in FIG. 1.

DETAILED DESCRIPTION OF THE INVENTION

Figure 3:
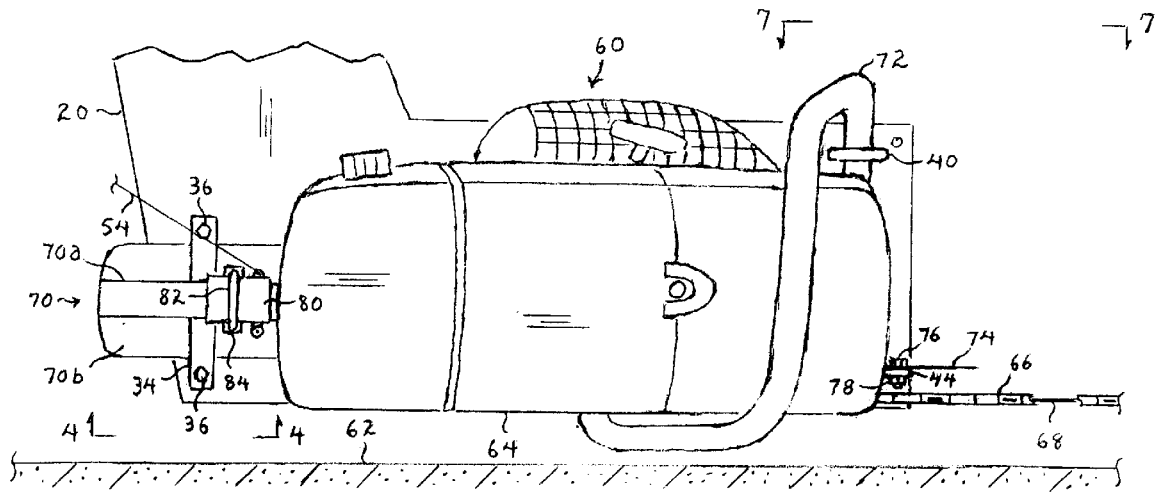
FIG. 3 is a side view of a chain saw as mounted to a mounting bracket of the caddie.

Referring to FIG. 1, the illustrated chain saw caddie is shown in its normal orientation for use, but without a chain saw mounted thereon. A pair of wheels 10 are rotatably mounted to opposing ends of an axle 12 so as to be spaced from one another. Each wheel 10 includes a hub 14, having suitable bearings, which is secured to a threaded end of axle 10 by means of a nut 16. Wheels 10 have a common rotational axis 18, and are adapted to rest upon a supporting surface with the rotational axis parallel thereto. Portions of one wheel are broken away to show elements hereafter described.

A mounting bracket 20 is preferably in the form of an L-shaped plate depending from and fixedly connected to axle 12 between wheels 10 so as to be supported by the wheels. A substantially rectangular plate 22 abuts the inner side of mounting bracket 20. Axle 12 extends through aligned holes in mounting bracket 20 and plate 22, and has a threaded section over which a pair of nuts 24 and associated washers are received on opposite sides of mounting bracket 20 to securely hold the mounting bracket, as well as plate 22, in a fixed relationship to the axle. Only the inner nut 24 and its associated washer, shown as abutting plate 22, is visible in FIG. 1. A plate 26, substantially identical to plate 24, is spaced from plate 24 and is securely fixed in position with respect to axle 12 by means of nuts 28 and associated washers. Only the outer nut 28 and its washer are visible in FIG. 1. Tubular spacer 30 is received over, but not affixed to, that portion of axle 12 between mounting bracket 20 and the hub of the adjacent wheel, and tubular spacer 32 is similarly received over that portion of axle 12 between plate 26 and the hub of the other wheel. Broken lines indicate those portions of axle 12 extending through spacers 30 and 32.

Three separate fastener mechanisms are shown in disassembled form. First, a clamp bar 34 has a pair of holes which align with a corresponding pair of holes in mounting bracket 20. Bolts 36 are adapted to be received through such holes, and associated nuts 38 can be threadedly received over the ends of bolts 36. A second set of holes are shown in mounting bracket for an alternate position of clamp bar 34, thereby providing adaptability to different designs and models of chain saws. Second, a U-bolt 40 has threaded ends adapted to be received through a corresponding pair of holes in mounting bracket 20. Nuts 42 can be threadedly received over the ends of U-bolt 40. A second set of holes are provided for an alternate position of U-bolt 40. Of course, more than one alternate set of holes could be provided for U-bolt 40, as well as for clamp bar 34, if desired. Third, a flange member 44 has a hole therethrough and a threaded shaft adapted to be received through a hole in mounting bracket 20. A nut 46 can be threadedly received onto the threaded shaft of flange member 44. Two additional holes are provided in mounting bracket 20 for alternate positions of flange member 44. Of course, even more holes could be provided for other alternate positions if desired.

Handlebar 48 has a lower portion fixedly connected to plate 22 and mounting bracket 20 by means of bolts, extending through such plate and mounting bracket, and associated nuts (not visible in FIG. 1) on the outer side of the mounting bracket. Handlebar 50 has a lower portion fixedly connected to plate 26 in a similar manner with bolts and nuts. Since plates 22 and 26 are fixedly connected to axle 12, handlebars 48 and 50 are, therefore, also fixedly connected to axle 12 by means of their fixed connection to the plates. Handlebars 48 and 50 extend above axle 12 and mounting bracket 20 to upper, handle portions for being grasped by a user of the caddie in movement and manipulation thereof. A hand lever 52, preferably spring loaded to bias the lever to the position shown, is pivotally connected to the handle portion of handlebar 50. A control cable 54 is fixedly connected to hand lever 52 in such a manner that squeezing the handle portion and associated hand lever, and consequent movement of the hand lever upward from the position shown, will pull cable 54 generally upward and toward the handle portion. The purpose of manipulation of cable 54, of which only a portion is shown in FIG. 1, will be apparent from subsequent discussion and FIGURES. A cross bar 56 extends between and is fixedly connected to handlebars 48 and 50.

Referring to FIG. 2, this view shows the opposing, outer side of mounting bracket 20 as well as the lower portion of handlebar 48 as fixedly connected to the mounting bracket. The outer side of mounting bracket 20 preferably has a curved reinforcement bar 58 affixed (i.e. by welding) thereto. FIG. 2 also shows cross sections of axle 12 and spacer 30, as well as outer nut 24 and its associated washer.

Referring to FIG. 3, a chain saw 60 is shown as fixedly but removably mounted to mounting bracket 20. It should be understood that chain saw 60 is illustrated in a pictorially schematic form with unnecessary details omitted or slightly modified for ease and clarity of illustration. Mounting bracket 20 is positioned as in FIG. 1 relative to a supporting surface 62 (i.e. surface of the ground). Chain saw 60 includes a body 64 having a front end from which a saw bar extends, and the chain saw is oriented in a position in which the saw bar defines and lies in a plane substantially parallel and closely adjacent to surface 62. A portion of a chain 66 is broken away to reveal the saw bar as indicated at 68. The illustrated and described orientation of chain saw 60 and its saw bar 68 is normally optimal for cutting a tree close to surface 62.

The manner in which the previously described fastener mechanisms secure chain saw 60 to mounting bracket 20 will now be described. A rear handle 70 extends from rear end of body 64, and has rear handle portions 70a and 70b. clamp bar 34 extends over and in contact with rear handle portion 70b. Bolts 36 and associated nuts (not visible in FIG. 3) on the opposite side of mounting bracket 20 secure clamp bar 34 in position over rear handle portion 70b and to the mounting bracket, thereby fixedly but removably securing handle 70 to the mounting bracket. A front handle 72 extends from body 64 adjacent to its front end. U-bolt 40 fits over a portion of front handle 72 as shown. Associated nuts (not visible in FIG. 3) on the opposite side of mounting bracket 20 secure U-bolt 40 over such portion of front handle 72 and to the mounting bracket, thereby fixedly but removably securing the front handle to the mounting bracket. A bumper ear 74, which can come into contact with the outer surface of a tree, extends from the front end of body 64 adjacent to saw bar 68. Flange member 44 is secured to mounting bracket 20 with its associated nut (not visible in FIG. 3) so as to extend from the mounting bracket underneath bumper ear 74. A bolt 76 is received through the hole (see FIG. 1) in flange member 44 and an aligned hole in bumper ear 74, and an associated nut 78 is threadedly received onto bolt 76 to secure flange member 44 to bumper ear 74, thereby fixedly but removably securing the bumper ear to mounting bracket 20. Certain models of chain saws in their commercially available form, such as heavy duty "production saws" manufactured by STIHL AG & Co. of Waiblingen, Germany, have bumper ears with a suitable hole for receiving bolt 76 therethrough.

FIG. 3 also shows a U-bracket 80 fixedly but removably secured to rear handle portion 70a by means of U-bolt 82 and clamp plate 84. A portion of control cable 54 is shown, which extends from hand lever 52 (see FIG. 1). Cable 54 is adapted to control the throttle of the chain saw employing guide members affixed to U-bracket 80, as is described further below.

Figure 4:
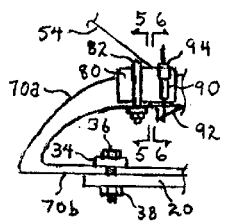
FIG. 4 is a view of rear portions of the chain saw and mounting bracket as viewed along line 4—4 in FIG. 3.
Figure 5:
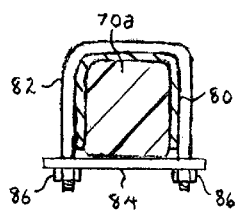
FIGS. 5 and 6 are cross-sectional views as viewed along lines 5—5 and 6—6, respectively, in FIG. 4.

Referring to FIG. 4, this view shows one of bolts 36 and its associated nut 38 securing clamp bar 34 in position over rear handle portion 70b and to mounting bracket 20. Referring to FIG. 4 in conjunction with FIG. 5, U-bracket 80 fits over rear handle portion 70a and U-bolt 82 fits over U-bracket 80. Clamp plate 84 extends under and in contact with rear handle portion 70a. Nuts 86 are received over threaded end portions of U-bolt 82 to secure clamp plate 84 and U-bracket 80 in the positions as shown and described. Referring to FIG. 4 in conjunction with FIG. 6, tubular guide members 88 and 90 are affixed to opposite sides of U-bracket 80. Rear handle portion 70a has a throttle trigger 92 associated therewith. Cable 54 extends through guide member 88, loops around and under throttle trigger 92, and extends through guide member 90 to the end of the cable. A tubular lug 94 is attached to a portion of cable 54 between guide member 90 and the end of the cable. A set screw 96 in the side of lug 94 holds cable 54 in a fixed relationship with respect to the lug. Set screw 96 can, therefore, be conveniently used to set lug 94 in the proper position on cable 54 for a particular chain saw. An excess length of cable can be provided prior to assembling the components as illustrated, and an end portion of the cable cut off once the approximate proper position of lug 94 is set. Broken lines indicate cable 54 as extending through the guide members and lug.

Although not shown on the illustrated chain saw, many chain saws have a rear handle portion with a throttle trigger interlock on the side opposite the throttle trigger. Such a throttle trigger interlock is a safety device that must be depressed to enable control of the throttle with the throttle trigger. The above described U-bracket, as secured to a rear handle portion having a throttle trigger interlock, would hold the interlock in its depressed position.

Figure 7:
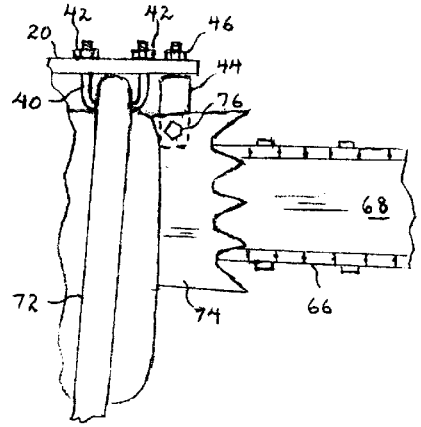
FIG. 7 is a view of front portions of the chain saw and mounting bracket as viewed along line 7—7 in FIG. 3.

Referring to FIG. 7, this view more clearly shows the manner in which U-bolt 40 fits over a portion of front handle 72, and further shows nuts 42 as threadedly received over the ends of the U-bolt to thereby secure front handle 72 to mounting bracket 20. FIG. 7 also more clearly illustrates the manner in which flange member 44 extends from mounting bracket 20 as secured thereto with nut 46. A top view of bolt 76, for securing bumper ear 74 to flange member 44, is shown in FIG. 7. Broken lines indicate that portion of flange member 44 extending under bumper ear 74. Bumper ear 74 in the illustrated embodiment can be seen to have spikes for effectively engaging the outer surface of a tree if this becomes necessary or desirable. Finally, FIG. 7 shows a top view of saw bar 68 and its associated chain 66.

Figure 6:
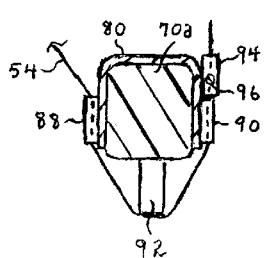

In describing operation of the chain saw caddie, reference will be made to FIGS. 1, 3, and 6. In cutting a tree with the caddie, the user grasps the handle portions of handlebars 48 and 50 and rolls the caddie up to the tree with saw bar 68 preferably positioned as shown in FIG. 3. After chain saw 60 is started, the user squeezes hand lever 52 to pull cable 54 generally upward to thereby remotely control throttle trigger 92. As the moving chain 66 engages and cuts through the tree, the user can pivot the caddie on one wheel 10 while rolling the other wheel forward or rearward (depending upon the horizontal direction of the cut) by appropriate manipulation of the handlebars. When cutting a very large tree, the user may need to stop cutting after cutting through a portion of the tree, back the caddie up, and then repeat the above-described procedure. The user can then simply roll the caddie to another tree or trees which need cutting. Such operation is all performed while standing or walking comfortably in an upright position with a minimum of effort and stress to the user's back.

Obviously, many modifications and variations of the present invention are possible in light of the above teachings. For example, a bolt normally employed to secure the bumper ear to the body of the chain saw could be received through the hole of a flange member having a suitable configuration and length to thereby secure the flange member as well as the bumper ear to the body adjacent to or at its front end. According to broad aspects of the invention, the flange member could be secured to any structure of the chain saw, other than the front handle, which is adjacent to or at the front end of the chain saw body. It is, therefore, to be understood that within the scope of the appended claims, the invention can be practiced otherwise than as specifically described.

That which is claimed is:

1. An apparatus comprising:
   a chain saw having a body with a front end and a rear end, a saw bar extending from the front end, a rear handle extending from the rear end, a throttle trigger associated with the rear handle, and a front handle extending from the body adjacent to the front end;
   an axle;
   at least one wheel, rotatably mounted to the axle and having a rotational axis, for resting upon a supporting surface with the rotational axis substantially parallel thereto;
   a first fastener;
   a second fastener;
   a vertical plate depending from the axle to thereby be supported by said at least one wheel, wherein the plate has a first hole receiving the axle, at least one second hole receiving the first fastener, and at least one third hole receiving the second fastener, all of said holes being within a first plane defined by the plate, and wherein the first and second fasteners fixedly but removably secure the rear and front handles, respectively, to the plate so as to fixedly but removably mount the chain saw to the plate such that the chain saw can be oriented in a position in which its saw bar defines and lies in a second plane substantially parallel and closely adjacent to the supporting surface;
   a pair of handlebars, in a fixed relationship to the plate, having respective handle portions for being grasped by a user of the apparatus in movement and manipulation thereof;
   a hand lever pivotally mounted to the handle portion of one handlebar; and
   a control cable extending from the hand lever to the throttle trigger of the chain saw to enable a user of the apparatus to remotely control the throttle trigger by manipulation of the hand lever.

2. An apparatus as recited in claim 1 wherein said at least one wheel comprises a pair of wheels rotatably mounted to the axle so as to be spaced from one another.

3. An apparatus as recited in claim 2 wherein the plate is fixedly connected to the axle between the wheels.

4. An apparatus as recited in claim 3 wherein the handlebars are fixedly connected to the axle.

5. An apparatus as recited in claim 4 wherein the first fastener includes a clamp bar, for extending over a portion of the rear handle, and associated bolts and nuts for securing the clamp bar in position over said portion of the rear handle and to the plate, said at least one second hole comprising second holes corresponding to and receiving the bolts therethrough.

6. An apparatus as recited in claim 5 wherein the second fastener includes a U-bolt for fitting over a portion of the front handle and associated nuts for securing the U-bolt over said portion of the front handle and to the plate, said at least one third hole comprising third holes receiving the U-bolt therethrough.

7. An apparatus as recited in claim 6 further comprising a third fastener for fixedly but removably securing a portion of the chain saw, other than the front handle, adjacent to or at the front end of the body to the plate.

8. An apparatus as recited in claim 7 wherein the third fastener includes a flange extending from the plate and a means for securing the flange to said portion of the chain saw.

9. An apparatus as recited in claim 8 wherein said portion of the chain saw comprises a bumper ear extending from the front end of the body adjacent to the saw bar, and wherein the means for securing the flange to the bumper ear comprises a bolt and nut.

10. An apparatus comprising:
    a chain saw having a body with a front end and a rear end, a saw bar extending from the front end, a rear handle extending from the rear end, and a front handle extending from the body adjacent to the front end;
    an axle;
    at least one wheel, rotatably mounted to the axle and having a rotational axis, for resting upon a supporting surface with the rotational axis substantially parallel thereto;
    a first fastener;
    a second fastener;
    a vertical plate depending from the axle to thereby be supported by said at least one wheel, wherein the plate has a first hole receiving the axle, at least one second hole receiving the first fastener, and at least one third hole receiving the second fastener, all of said holes being within a first plane defined by the plate, and wherein the first and second fasteners fixedly but removably secure the rear and front handles, respectively, to the plate so as to fixedly but removably mount the chain saw to the plate such that the chain saw can be oriented in a position in which its saw bar defines and lies in a second plane substantially parallel and closely adjacent to the supporting surface; and
    a handlebar means, in a fixed relationship to the plate, for being grasped by a user of the apparatus in movement and manipulation thereof.

11. An apparatus as recited in claim 10 wherein said at least one wheel comprises a pair of wheels rotatably mounted to the axle so as to be spaced from one another.

12. An apparatus as recited in claim 11 wherein the plate is fixedly connected to the axle between the wheels.

13. An apparatus as recited in claim 12 wherein the handlebar means is fixedly connected to the axle.

14. A caddie for a portable, hand-held chain saw having a body with a front and rear end, a saw bar extending from the front end, said caddie, comprising:
    an axle;
    at least one wheel, rotatably mounted to the axle and having a rotational axis, for resting upon a supporting surface with the rotational axis substantially parallel thereto;
    a vertical plate depending from the axle to thereby be supported by said at least one wheel, wherein the plate has a first hole receiving the axle and a plurality of second holes, all of said holes being within a first plane defined by the plate;

fastener means, received by the second holes, for fixedly but removably securing the rear end of the the front end of the chain saw to the plate such that the chain saw can be oriented in a position in which its saw bar defines and lies in a second plane substantially parallel and closely adjacent to the supporting surface; and a handlebar means, in a fixed relationship to the plate, for being grasped by a user of the caddie in movement and manipulation thereof.

15. An apparatus as recited in claim 14 wherein said at least one wheel comprises a pair of wheels rotatably mounted to the axle so as to be spaced from one another.

16. An apparatus as recited in claim 15 wherein the plate is fixedly connected to the axle between the wheels.

17. An apparatus as recited in claim 16 wherein the handlebar means is fixedly connected to the axle.

* * * * *

UNITED STATES PATENT AND TRADEMARK OFFICE
CERTIFICATE OF CORRECTION

PATENT NO.      : 6,481,324 B1
DATED           : November 19, 2002
INVENTOR(S)     : Marvin P. Johnston Page 1 of 1

It is certified that error appears in the above-identified patent and that said Letters Patent is hereby corrected as shown below:

Column 6,
Line 57, "," should be deleted after "caddie".

Column 7,
Line 2, "of the" should be deleted after "rear end" and the word -- and -- substituted therefor.

Signed and Sealed this

Eighteenth Day of March, 2003

JAMES E. ROGAN
*Director of the United States Patent and Trademark Office*